2 Sheets—Sheet 1.
M. HUMPHREY.
Corn-Planter.
No. 210,537. Patented Dec. 3, 1878.
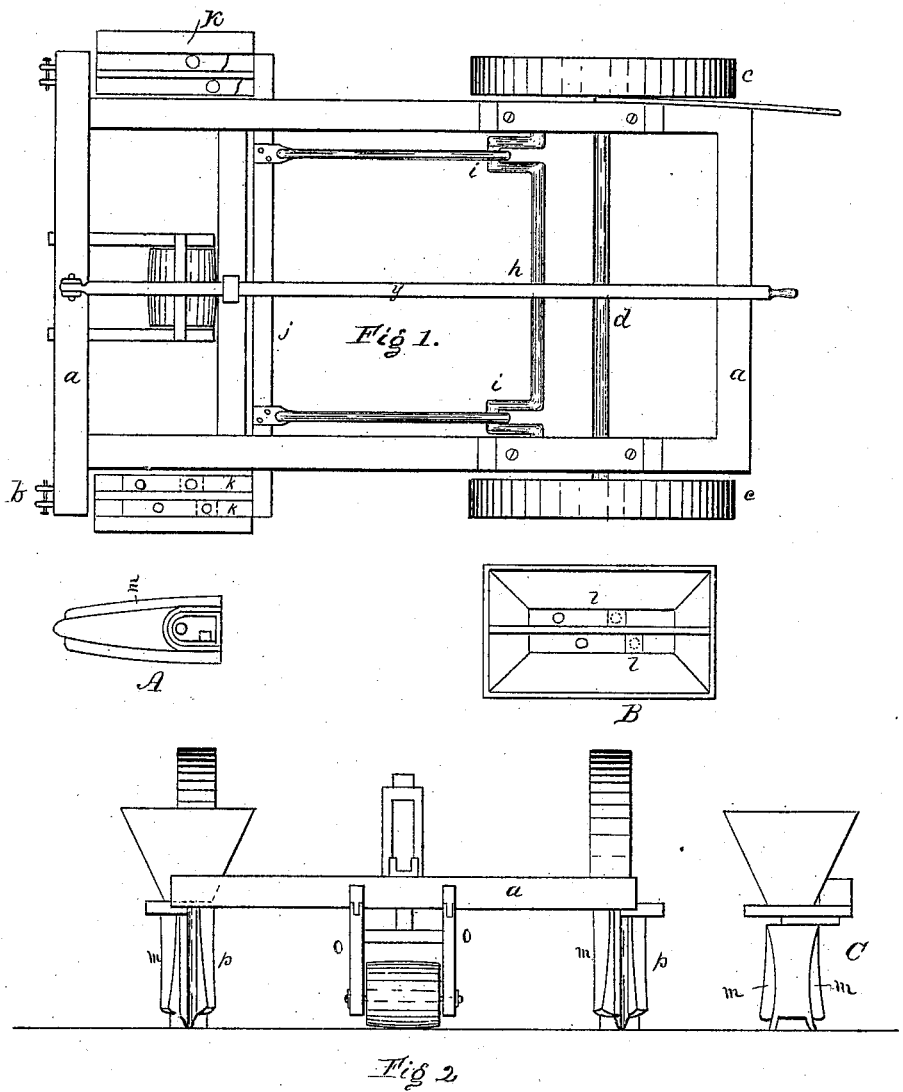
Witnesses
Chas C. Lund
J. C. A. Hill
Inventor
Moses Humphrey 2 Sheets—Sheet 2

M. HUMPHREY.
Corn-Planter.

No. 210,537. Patented Dec. 3, 1878.

Witnesses
Chas E. Lund
J. C. A. Hill

Inventor
Moses Humphrey

UNITED STATES PATENT OFFICE.

MOSES HUMPHREY, OF CONCORD, NEW HAMPSHIRE.

IMPROVEMENT IN CORN-PLANTERS.

Specification forming part of Letters Patent No. 210,537, dated December 3, 1878; application filed September 2, 1878.

*To all whom it may concern:*

Be it known that I, MOSES HUMPHREY, of Concord, in the county of Merrimack and State of New Hampshire, have invented certain Improvements in Corn-Planters, of which the following is a specification, reference being had to the accompanying drawings, which are made a part hereof, in which drawings—

Figure 3:
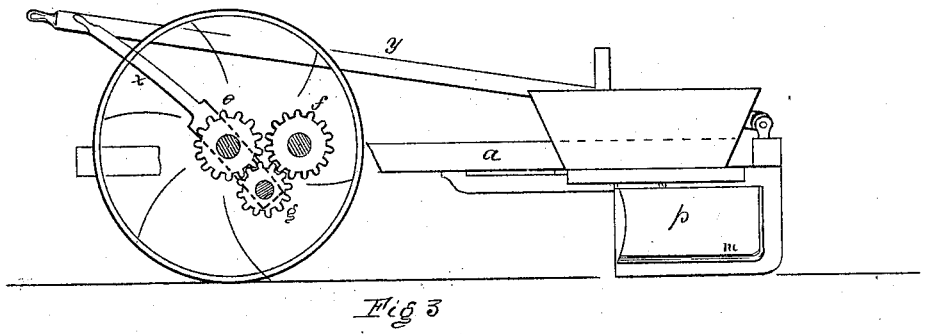
Figure 4:
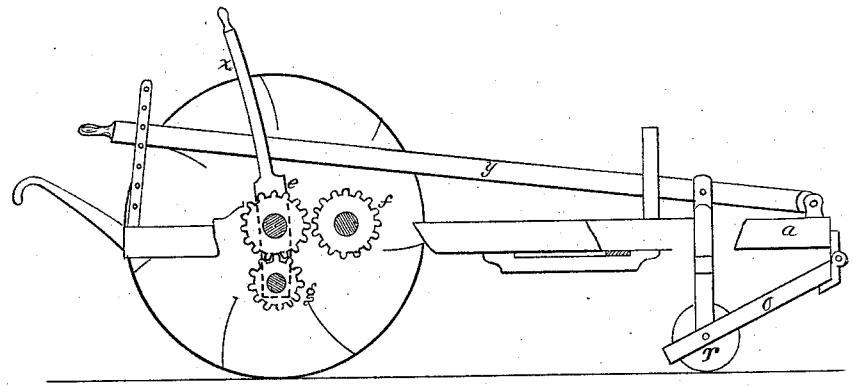

Figure 1 is a top view thereof. Fig. 2 is a front view. Fig. 3 is a side elevation, showing the side view of the plow $p$ and the driving-gear $e\,f\,g$ when the machine is thrown into gear for planting. Fig. 4 is a section of the forward roller, $r$, the use of which will be hereinafter explained, and also shows the driving-gear $e\,f\,g$ when the machine is thrown out of gear for turning corners or moving from place to place.

At A, Sheet 1, is shown a bottom view of one of the plows. B is a top view of one of the hoppers, one being on each plow, made in two compartments, one compartment to contain corn and the other phosphate. C is a rear view of one of the plows.

Referring to the figures, $a$ is a frame having ears or clips $b$ for attaching shafts for a horse. $c\,c$ are driving-wheels; $d$, the axle-tree. $e\,f\,g$ are spur-wheels, the use of which will appear. The spur-wheel $e$ is fixed upon the axle-tree. The spur-wheel $f$ is fixed upon a shaft extending across the frame, and the spur-wheel $g$ is upon the short arm of the lever $x$, which has its fulcrum upon the axle-tree $d$. When the spur-wheel $g$ is thrown into gear, as shown in Fig. 3, it transmits the motion from the wheel $e$ to $f$, and causes the crank-shaft to revolve. When the spur-wheel $g$ is thrown out of gear, as in Fig. 4, no motion will be communicated to the crank-shaft.

The cranks $i\,i$ are connected by rods to the cross-bar $j$, to which cross-bar $j$ slides $k\,k$ are provided, which move upon the top of my plow. These slides have holes punched in them of sufficient size to contain the number of kernels of corn and the amount of phosphate to be deposited in a hill. The slides are shown only upon the left-hand side of the machine, Fig. 1. On the right-hand side the top of my plow is shown with the slides cut away to show the apertures through which corn and phosphate pass to the furrow made by the plow.

The bottom of the hopper B is provided with guards $l\,l$, so placed that when the holes in the slides $k\,k$ come over the holes in the plow they will be underneath the guards $l\,l$, so that no more phosphate or corn will be discharged at a time than the holes in the slides will contain. It will be observed that at every half-revolution of the cranks $i\,i$ one set of holes in the slides $k\,k$ will come under the guards and discharge their contents, each set alternating with the other, one being filled while the other is being discharged.

My plow is made with a sharp point in front, (shown at A,) and widens toward the rear end. In the wide portion at the rear end are shown the holes. The round hole discharges phosphate, and the square hole corn.

The shape of the rear end of my plow is shown at C flaring at the bottom, so that the earth has a tendency to fall back to its original position after the plow has passed, and cover the corn.

A guard, $m$, is placed upon my plow, which will prevent its sinking too deep, and which also pushes aside sods, roots, &c., thus leaving the ground clear for the plow.

After the plow has passed the driving-wheels $c\,c$ pass over the seed and compact the earth upon it. Each side of my machine is provided with a plow, as shown in Fig. 2, thus enabling me to plant two rows at a time. The intervals between the rows are regulated by the width of the frame, and the intervals between the hills by the rapidity with which the crank-shaft $i$ revolves. By using different sizes of spur-wheels $f$, or pinions, I am able to drop corn and phosphate at any interval I may desire, and my machines are provided with a variety of sizes of spur-wheels, to be used in the place of $f$, to regulate such intervals between hills.

By having separate channels for my corn and phosphate, which drop through the plow into the furrow at the same moment, I am able to drop the corn and phosphate near each other, yet not so mixed with each other that the phosphate will kill the corn, as the channels are arranged somewhat out of line with each other.

When turning at the end of rows or passing from place to place the machine is thrown out of gear, as in Fig. 4. The lever $y$ is depressed, bringing the weight of the forward part of the machine upon the roller $r$ and lifting the plows out of ground, and when in this condition it may be driven from point to point or turned in any direction. Handles like plow-handles are provided at the rear for convenience in throwing the machine round in position to start right at the beginning of the row. I am also able by the use of the lever $y$ to throw part of the weight of the machine upon the roller $r$, and thus preventing the plows from sinking too deep in soft ground.

I claim—as my invention and desire to secure by Letters Patent—

In a corn-planter, a plow provided with two vertical channels at its rear portion, the channel for phosphate being round and that for corn square, the latter being arranged somewhat out of line with the former, so that the phosphate will not drop on the corn and burn it, substantially as set forth.

MOSES HUMPHREY.

Witnesses:
CHAS. C. LUND,
J. C. A. HILL.